(12) United States Patent
Köhler et al.

(10) Patent No.: US 11,673,468 B2
(45) Date of Patent: Jun. 13, 2023

(54) METHOD AND DEVICE FOR DISPLAYING A POINTER IN AN INSTRUMENT PANEL, AND VEHICLE HAVING A DISPLAY DEVICE

(71) Applicant: e.solutions GmbH, Ingolstadt (DE)

(72) Inventors: Thomas Köhler, Nuremberg (DE); Horst Hadler, Bubenreuth (DE); Matthias Stock, Heroldsbach (DE); Ari Romano Pfefferkorn, Erlangen (DE)

(73) Assignee: E.SOLUTIONS GMBH, Ingolstadt (DE)

( * ) Notice: Subject to any disclaimer, the term of this patent is extended or adjusted under 35 U.S.C. 154(b) by 39 days.

(21) Appl. No.: 16/857,682

(22) Filed: Apr. 24, 2020

(65) Prior Publication Data

US 2020/0338985 A1 Oct. 29, 2020

(30) Foreign Application Priority Data

Apr. 26, 2019 (DE) .......................... 102019003041.9

(51) Int. Cl.
*B60K 35/00* (2006.01)
(52) U.S. Cl.
CPC ........ *B60K 35/00* (2013.01); *B60K 2370/154* (2019.05); *B60K 2370/50* (2019.05); *B60K 2370/731* (2019.05)
(58) Field of Classification Search
CPC .............. B60K 35/00; B60K 2370/731; B60K 2370/50; B60K 2370/154
See application file for complete search history.

(56) References Cited

U.S. PATENT DOCUMENTS

| 8,339,400 B2* | 12/2012 | Katoh | G12B 11/02 345/440.2 |
| 8,558,681 B2* | 10/2013 | Nishiyama | B60K 37/02 340/438 |
| 2005/0068343 A1 | 3/2005 | Pan et al. | |
| 2011/0010776 A1* | 1/2011 | Ceraolo | G06Q 10/087 726/28 |
| 2012/0019374 A1 | 1/2012 | Nishiyama | |
| 2018/0108117 A1* | 4/2018 | Maeda | G06T 13/80 |

FOREIGN PATENT DOCUMENTS

| DE | 102007019823 A1 | 11/2007 |
| DE | 102007029457 A1 | 1/2008 |
| DE | 102007002534 A1 | 8/2008 |
| DE | 102018201381 A1 | 8/2018 |
| WO | 2012122033 A1 | 9/2012 |
| WO | 2016081257 A1 | 5/2016 |

* cited by examiner

*Primary Examiner* — Wing H Chow
(74) *Attorney, Agent, or Firm* — Tarolli, Sundheim, Covell & Tummino L.L.P.

(57) ABSTRACT

A method for displaying a pointer in an instrument panel is described. The method comprises retrieving a current instrument status of an instrument of the instrument panel that is to be displayed, determining a pointer form on the basis of the current instrument status, retrieving of the determined pointer form from a texture atlas, and rendering the pointer in the instrument panel with the retrieved pointer form. There is further described a device for displaying an instrument panel, which device comprises a display module configured to display at least one instrument panel having at least one pointer instrument, and a controller configured to carry out the method using the display module. A vehicle having such a device is also disclosed.

13 Claims, 4 Drawing Sheets

METHOD AND DEVICE FOR DISPLAYING A POINTER IN AN INSTRUMENT PANEL, AND VEHICLE HAVING A DISPLAY DEVICE

RELATED APPLICATIONS

The present invention is a Nonprovisional Application under 35 USC 111(a), claiming priority to Serial No. DE 10 2019 003 041.9, filed on 26 Apr. 2019, the entirety of which is incorporated herein by reference.

The invention relates to a method and a device for displaying a pointer in an instrument panel, and also to a vehicle having such a display device. In particular, the invention relates to a method, a device and a corresponding vehicle, wherein a pointer of an instrument of the instrument panel that is to be displayed is retrieved from a texture atlas and rendered with the retrieved pointer form on a display device.

Conventional display methods and devices for instrument panels compute the position of a pointer on the basis of status data of an instrument (for example of a speedometer or revolution counter). The instrument to be displayed is then rendered, that is to say electronically drawn and sent to a display module, with the pointer at the computed position by a corresponding graphics controller or graphics processor.

When displaying moving objects, the visibility is limited by technical conditions. The frame rate provided or used by a display module can thus represent a limitation, as can a processor power (image generation frequency by the graphics processor and/or graphics/video memory) provided for generating the graphics. By generating and displaying individual images at specific points in time, it becomes difficult to display a moving pointer clearly and distinctly above a specific speed of the pointer. Changes of the pointer over time can thus be represented distinctly only at frequencies that are smaller than or equal to half the sampling frequency, as is described in the Nyquist-Shannon sampling theorem.

When displaying moving objects, aliasing errors or other display artefacts can occur, as a result of which a stroboscopic effect (jitter) becomes visible in the case of conventional display devices. FIG. 1 shows schematically such an effect in the case of a pointer. Alternatively, such a jitter can deliberately be displayed, the pointer shown on the right in FIG. 1 corresponding approximately to the pointer at the current point in time, while the pointers shown to the left thereof each represent a pointer position from the past. By decreasing the brightness and/or color (color intensity) of the pointers representing the past, the speed of the moving pointer is illustrated for the observer. Since multiple pointers are simultaneously visible or deliberately displayed in the variant shown in FIG. 1, it is difficult for the observer to read the pointer and in particular to discern the exact position of the pointer.

A further possible method of representing a (quickly) moving object has therefore been provided in the form of motion blur. FIG. 2 shows schematically an object, similar to a pointer, which is represented with motion blur. The object is thereby not displayed at a fixed position but "spread" over a specific range. This motion blur is mostly used above a specific speed of the object that is to be represented (above a specific threshold value). There are thus likewise visible jumps in the representation of the object when changing from an object that is represented singly to an object that is represented with motion blur and vice versa.

The display of a pointer both with jitter (FIG. 1) and with motion blur (FIG. 2) requires a high computing power, since it is necessary to compute moving graphics in a larger range, and thus a larger number of changing pixels, with each image repetition than is the case with a single pointer.

Accordingly, the object underlying the invention is to provide a method and a device for displaying a pointer in an instrument panel, and also a vehicle having such a display device, which permits an optimally readable display of a moving pointer with as low a computing power as possible.

This object is achieved by a method having the features of claim 1, by a device having the features of claim 7, and by a vehicle having the features of claim 12.

According to a first aspect for better understanding of the present disclosure, the method for displaying a pointer in a digital instrument panel comprises retrieving a current instrument status of an instrument of the instrument panel that is to be displayed, determining a pointer form on the basis of the current instrument status, retrieving the determined pointer form from a texture atlas, and rendering the pointer in the instrument panel with the retrieved pointer form.

The texture atlas comprises at least one already computed image (graphic or texture) of a pointer or of a specific pointer form. Because the pointer is rendered by means of a pointer form retrieved from a texture atlas, the computational cost and/or the computational complexity is/are the same for each image generation cycle. The pre-computed image (graphic or texture) of the pointer can be loaded from the texture atlas and displayed quickly and simply independently of the movement and speed of the pointer and independently of the position of the pointer. The rendering operation is therefore identical every time, at least as far as the computing power and, for the most part, also the memory usage are concerned.

In conventional systems, in particular when using motion blur (FIG. 2), a pointer that is to be represented with motion blur must be newly computed for the current position on the display before any update of the display (pixel refresh).

According to the method disclosed herein, this takes place beforehand and must be carried out only once. As a result, significant computing power is saved during the display of an instrument with a pointer. Also, the information stored in the texture atlas can be used for more than one instrument (for example speedometer and revolution counter with pointers that look the same), so that, overall, computing power for representing and displaying an instrument panel is saved.

The texture atlas can thus comprise a plurality of graphics, textures, images, etc., wherein each graphic, texture, image, etc. contains a pointer form. This also makes it possible to use different configurations of the pointer. Pointer variants with jitter and/or motion blur can thus be stored in the texture atlas for a specific pointer form. Both the jitter and the motion blur can thereby be pronounced to differing degrees, for example depending on a speed or acceleration of the pointer that is to be displayed.

For example, the texture atlas can comprise a graphic, texture, image, etc. for a "normal" pointer (a pointer that is stationary or moving only very slowly), a graphic, texture, image, etc. for a pointer that is moving slightly more quickly and has a shadow extending into the past, a graphic, texture, image, etc. for a pointer that is moving slightly more quickly with low motion blur or jitter, a graphic, texture, image, etc. for a pointer that is moving even more quickly with significant motion blur. The number of different grades of shadow, motion blur and/or further different representations of the pointer is thereby not limited.

When determining the pointer form on the basis of the current instrument status it is thus possible, in dependence on different parameters (instrument status, such as, for example, current speed of the pointer, acceleration of the pointer, position of the pointer in relation to further displayed elements (instrument scale, background, etc.)), to select a specific pointer form which best reflects the current parameters and/or with which the pointer is best visible/discernible.

The retrieval of the determined pointer form from the texture atlas can take place via a simple identification method. Thus, each graphic, texture, image, etc. can be retrieved from the texture atlas via a unique identifier (ID) which is determined when the pointer form is determined. Alternatively or in addition, a graphic, texture, image, etc. can be identified by means of coordinates in a larger (superordinate) graphic, texture, image, etc. having all the pointer forms. Preferably, each graphic, texture, image, etc. has an identical size within the superordinate graphic, texture, image, etc. so that only the origin coordinates have to be determined and the corresponding graphic, texture, image, etc. has to be retrieved from the texture atlas.

In a further implementation variant, the determination of a pointer form can comprise the computation of a pointer position. The pointer position can be any position along a linear and/or bent instrument profile (in particular profile of the scale of the instrument). Thus, in the case of a round or curved instrument, the pointer position can be a radial position. In the case of a straight and/or bent instrument profile, the pointer position can be computed as one-dimensional or multi-dimensional coordinates, which reflects a specific position along the instrument profile (along the axis of the scale displayed in the instrument).

The rendering of the pointer can thus comprise a rendering of the pointer with the retrieved pointer form at the computed pointer position. The rendering can thereby further comprise an orientation of the pointer according to the pointer position. For example, the texture atlas can contain the different pointer forms with the same orientation. According to the pointer position, the retrieved graphic, texture, image, etc. may have to be turned (rotated) in order to be adapted to the position of the pointer within the instrument on the displayed instrument. Thus, the retrieved pointer form can be so oriented that it is perpendicular to a line or curve describing the scale of the instrument. Furthermore, the retrieved pointer form can be adapted to the size of the displayed instrument by flipping and/or a zoom function. A three-dimensional view of the pointer can of course also be generated on the basis of the pointer form retrieved from the texture atlas.

In a further implementation variant, the computation of the pointer position can comprise a computation of the pointer position at a future point in time at which the pointer will be displayed in the instrument panel. Thus, when retrieving the current instrument status, a specific value that is to be displayed by the pointer can be determined. This value corresponds to a specific position in the scale of the instrument. However, a specific period of time elapses between the retrieval of the current instrument status and the actual display of the pointer on a display module (display, screen, etc.). For example, the implementation of the further method steps and the generation of the corresponding pixel data in a graphics memory (video memory) and the display of the pixels on the display module according to the updated graphics memory require a specific period of time. After this period of time, the pointer may have a different value than was the case at the time at which the current instrument status was retrieved.

Furthermore, in an implementation variant, the determination of a pointer form can further comprise a determination of a speed of the pointer with which the pointer is moving in the instrument of the instrument panel that is to be displayed. The speed can be determined on the basis of previous instrument statuses. The speed of the pointer can be computed in any desired unit, for example centimeters per second, pixels per second, degrees per second (in the case of round instruments), value to be displayed in the instrument per second, etc. By multiplying the determined speed of the pointer with a specific period of time, for example the above-described delay owing to the graphics processing until the pointer is actually displayed on a display module, or any desired period of time, in order to specify a future point in time, a future position of the pointer can be determined.

Alternatively or in addition, the determination of the pointer form can further comprise a determination of a motion blur type on the basis of the determined speed of the pointer. The faster the pointer is moving, the greater the motion blur. For example, the region in which a motion-blurred pointer is represented can become larger as the speed of the pointer increases. Thus, for higher speeds of the pointer, a pointer form with greater motion blur can be retrieved.

Likewise alternatively or in addition, the motion blur type can also be determined in dependence on a positive or negative speed of the pointer. For example, a motion blur type can comprise a blur into the past, into the future, or into the past and the future. A blur into the past means that the pointer is represented blurred in the direction from which the pointer is coming (that is to say, pointer positions at which the pointer was situated at a previous point in time), while a blur into the future means that the pointer is represented blurred in the direction in which the pointer is moving (that is to say, pointer positions at which the pointer will (probably) be situated at a future point in time). A possible form of blur is blurring of the corresponding side or edge of the pointer that is to be displayed. Another form of blur is an "after-glow" or "fore-glow" of the pointer.

In an implementation variant, the determination of a motion blur type can comprise a comparison of the speed of the pointer with at least one threshold value. A motion blur type can thereby be chosen in dependence on whether the speed of the pointer exceeds the at least one threshold value. Thus, for example, multiple speed ranges can be defined by corresponding threshold values, in each of which speed ranges a specific pointer form is used for displaying the pointer. The speed-dependent motion blur types also include the above-described blur into the past or into the future or both.

The texture atlas can further be adapted to comprise a plurality of different pointer types. For each pointer type, the plurality of pointer forms is stored in the texture atlas. The pointer types can on the one hand be pointers having different appearances for the same instrument. On the other hand, pointer types for different instruments can also be stored in the texture atlas, wherein each of those instruments is rendered by the method according to the first aspect or an implementation variant thereof. For each pointer type, different pointer forms can be computed in advance and stored in the texture atlas.

According to a further aspect for better understanding of the present disclosure, a device for displaying an instrument panel comprises a display module configured to display at least one instrument panel having at least one pointer instrument, and a controller configured to carry out the method according to the first aspect using the display module. Thus, the controller can determine a pointer form and display it on the display module at a corresponding position in the instrument of the instrument panel.

In an implementation variant, the device further comprises a memory configured to store at least one texture atlas and provide it to the controller. The texture atlas comprises the graphics, textures, images, etc. described in relation to the first aspect for quickly and easily displaying specific pointer forms, and also pointer types with specific pointer forms, on the display module.

In a further implementation variant, the controller is further configured to compute one or more pointer forms, and optionally also one or more pointer types with one or more pointer forms, and to store the computed one or more pointer forms/pointer types in the memory. In other words, the device can be adapted to compute pointer forms in advance, wherein every type of pointer form described in relation to the first aspect can be computed by the device (in particular the controller). The pointer forms are then stored in the memory, for example in the form of a texture atlas. The controller can then perform a method according to the first aspect or an implementation variant thereof using the texture atlas.

In yet a further implementation variant, the computation of the one or more pointer forms and/or pointer types can be carried out on the basis of a user preference. Thus, the user can change the general appearance of the instrument panel by selecting or adjusting the user preference. This includes not only specific selected colors of the pointer, of the instrument, of the background, etc., but also the form of the pointer or the instrument of the instrument panel for which specific pointer forms are to be stored in the texture atlas. A user can thus also choose whether, for a specific instrument in the instrument panel, the pointer form is rendered differently according to the instrument status. Furthermore, different pointer types and/or pointer forms can be pre-selected for specific driving modes of the vehicle. The driving modes of the vehicle include, for example, an eco mode, sport mode, off-road mode, etc., so that the appearance of the instrument panel or of one or more instruments can be adjusted simply and quickly according to the chosen driving mode.

In another implementation variant, the device can further comprise an interface configured at least to receive data representing a texture atlas and to provide the data to the controller and/or to the memory for storing a texture atlas. The interface can be a wireless or wired interface or an interface for loading a storage medium. As a result, a texture atlas can be stored in the memory of the device so that it can be used by the device and in particular by the controller for displaying a pointer in an instrument. Furthermore, the texture atlas can also easily be exchanged so that the appearance of an instrument or of the instrument panel as a whole can quickly be changed (for example by a software update).

According to yet a further aspect for better understanding of the present disclosure, a vehicle comprises a device according to the second aspect.

The aspects, implementations and variants described above can of course be combined without this explicitly being described. Each of the described implementation variants is accordingly to be regarded as being optional to each of the aspects, implementations and variants or combinations thereof. The present disclosure is thus not limited to the individual aspects and implementation variants in the described order or to a specific combination of the aspects and implementation variants.

A preferred embodiment of the invention will now be explained in greater detail with reference to the accompanying schematic drawings, in which FIG. 1 shows, schematically, a conventional display of a pointer, wherein jitter has occurred;

Figure 1:
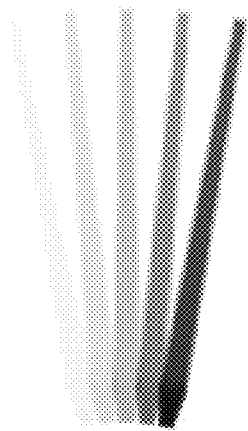
Figure 2:
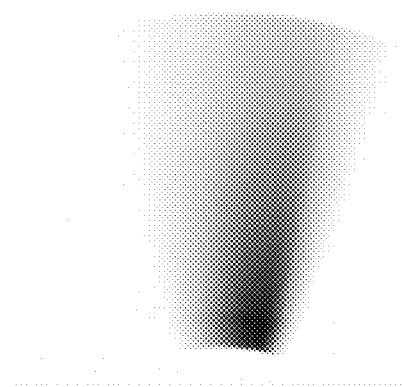
FIG. 2 shows, schematically, a display of a pointer with motion blur.
Figure 3:
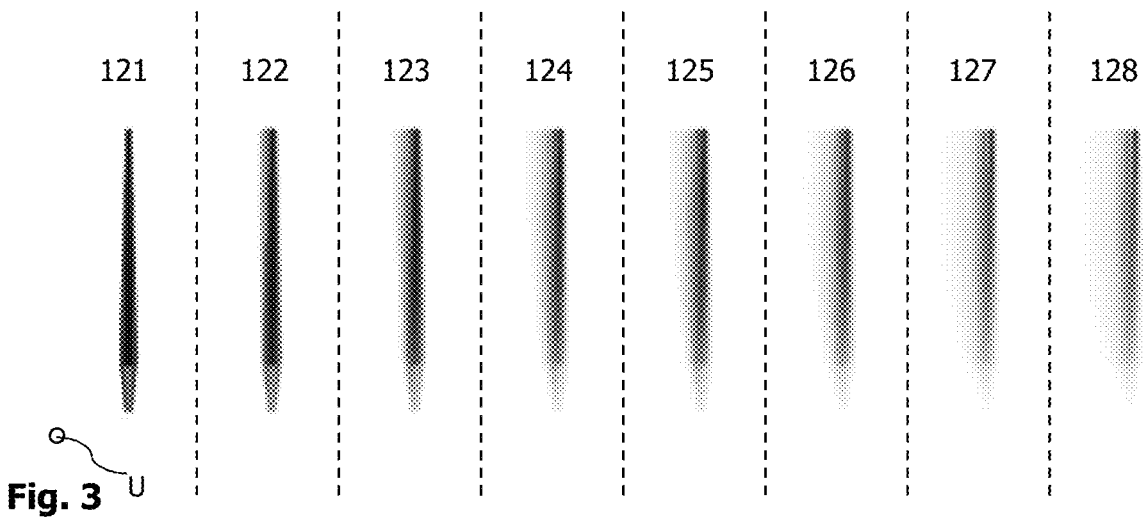
FIG. 3 shows, schematically, a texture atlas.

FIG. 3 shows, schematically, at least in part, a texture atlas 120. The texture atlas 120 can contain one or more pointer forms 121-128 for one or more pointer types. In FIG. 3, eight pointer forms 121-128 are shown by way of example for one pointer type. The pointer type is a lozenge that is stretched asymmetrically in its length, wherein the first pointer form 121 has sharp contour lines of the pointer. This first pointer form 121 can be used, for example, when the pointer is stationary or is moving only slowly within the instrument. In other words, the first pointer form 121 is used when a current instrument status corresponds to a previous instrument status or differs only marginally therefrom (for example by less than 10% or less than 5%).

The remaining pointer forms 122-128 have increasing motion blur. The corresponding pointer form 122-128 thus not only increasingly loses the sharp contour lines of the pointer but is also shown increasingly fainter in color. For example, the color of the pointer in the respective pointer form 122-128 can be represented increasingly more transparently. As a result, the color of the pointer is increasingly blended with a background color of the instrument 117 (FIG. 7), so that the color of the pointer becomes increasingly more similar to the background color. The pointer forms 122-128 can be used, for example, when the pointer is moving with a specific speed within the instrument 117. In an embodiment variant, a speed range between zero and a maximum displayable speed of the pointer (at which the pointer is still just discernible for an average observer) can be divided into speed ranges of equal size, wherein a pointer form 121-128 is associated with each speed range.

If a pointer that is moving on the scale of the instrument 117 with a specific speed (relative to the instrument 117 which is represented stationary in the display module) is to be displayed in an instrument 117, the corresponding pointer form 121-128 from the texture atlas 120 can be used. A subsequent rendering of the pointer in the instrument 117 on a corresponding display module 110 (FIG. 7) can thus be carried out very quickly and without extensive computations.

Figure 4:
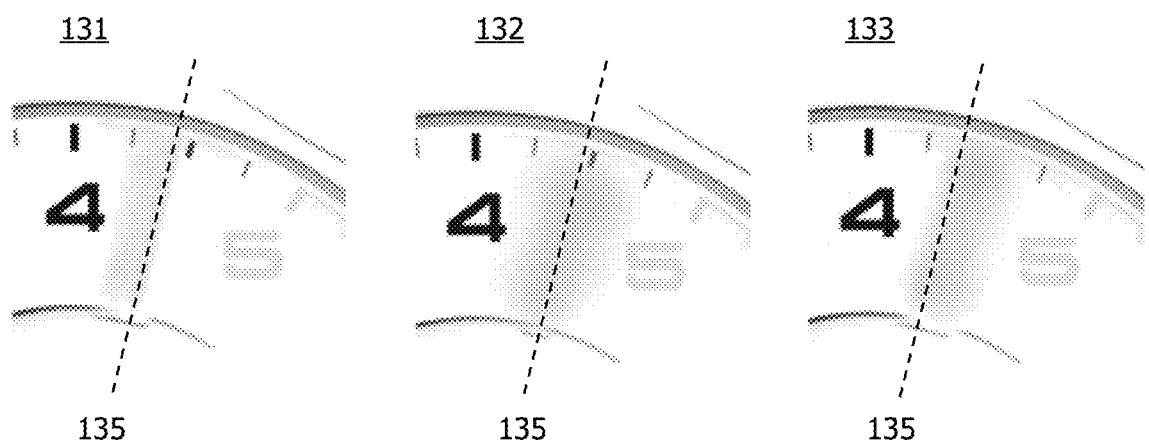
FIG. 4 shows, schematically, examples of motion blur types for a pointer in an instrument shown in part.

FIG. 4 shows, schematically, examples of motion blur types 131-133 for a pointer in an instrument 117 shown in part. In the case of the first motion blur type 131, a motion blur into the past is provided. In FIG. 4, the pointer is moving from left to right, or clockwise, and, at the point in time at which the representation of FIG. 4 is displayed, has considered position 135 relative to the scale of the instrument 117. The motion blur is thereby displayed in the region in FIG. 4 that is to the left of position 135. By way of example, the pointer is blurred in the region in which the pointer position is temporally before the current position 135 and depicted continuously fainter as the distance from the current position 135 increases. This motion blur type 131 can correspond, for example, to one of the pointer forms 122-128. The width of the blur, that is to say the distance between the current position 135 and the "oldest" region of the instrument 117 at which a blurred pointer is displayed, can be chosen in dependence on at least one parameter. For example, the region of the blur can be chosen to increase as the speed and/or acceleration of the pointer increases.

Motion blur type 132 comprises symmetrical motion blur, that is to say into the past and into the future. The motion blur into the future is correspondingly depicted to the right of the current position 135, or clockwise, and temporally before the current position 135. Symmetrical blur starting from the current position 135 can thereby be depicted. Furthermore, a blur can also be depicted at the current position 135, as is shown in FIG. 4. As a result, the actual current position 135 is only vaguely discernible, whereby high speeds of the pointer can be reflected. Here too, the entire width of the blur or the width of the pointer (the region in which a blurred pointer is displayed) can be chosen in dependence on at least one parameter of the instrument 117.

Finally, motion blur type 133 uses a blur directed into the future. For this purpose, pointer positions which, owing to the direction of movement of the pointer, are in the future (to the right of the current position 135, or clockwise, in FIG. 4) can be reflected by blurred regions of the pointer.

The texture atlas 120 can of course also contain pointer forms 121-128 which correspond to those of motion blur types 132, 133. Thus, for example, the texture atlas 120 shown in FIG. 3 can comprise further pointer forms other than the pointer forms 121-128, which are applied for specific parameters of the instrument status, or some or all of the pointer forms 121-128 can be replaced by other motion blur types.

It can also be seen in FIG. 4 that the pointer or pointer form 121-128 is not limited to a needle-shaped, elongate pointer. A motion blur can thus also be depicted at the outer and/or inner end of the pointer in a corresponding pointer form and/or be more pronounced than in the region of the actual pointer. For example, a motion blur can be represented at the outer end of the pointer that results in a T-shaped pointer, so that the position of the pointer (the instrument status) is made clear at the outer edge of the instrument scale. This increases the discernibility of the pointer even when the pointer is moving at high speeds within the instrument 117.

Figure 5:
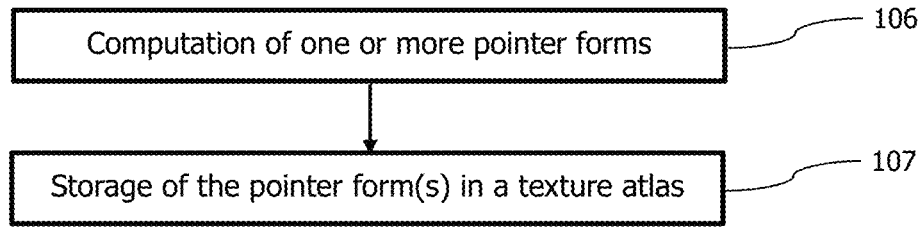
FIG. 5 shows an example of a flow chart of a method for generating a texture atlas.

FIG. 5 shows an example of a flow chart of a method for producing a texture atlas 120. In that method, one or more pointer forms 121-128 is/are first computed in a step 106. The computation comprises a drawing operation, wherein pixel values (color values, brightness, transparency, etc.) for a specific region are computed. Then, in a step 107, the at least one pointer form 121-128 is stored in the texture atlas 120. In other words, the computed pixel values are stored in a corresponding section of the texture atlas 120. Each of the sections corresponds to a pointer form 121-128 of the texture atlas. This method can be carried out independently of the subsequent use of the texture atlas 120, that is to say also independently of the hardware that renders the pointer using the texture atlas 120. For example, the texture atlas 120 can be generated on a server or other electronic device with a higher computing power than a control device for displaying instruments 117 and pointers.

Figure 6:
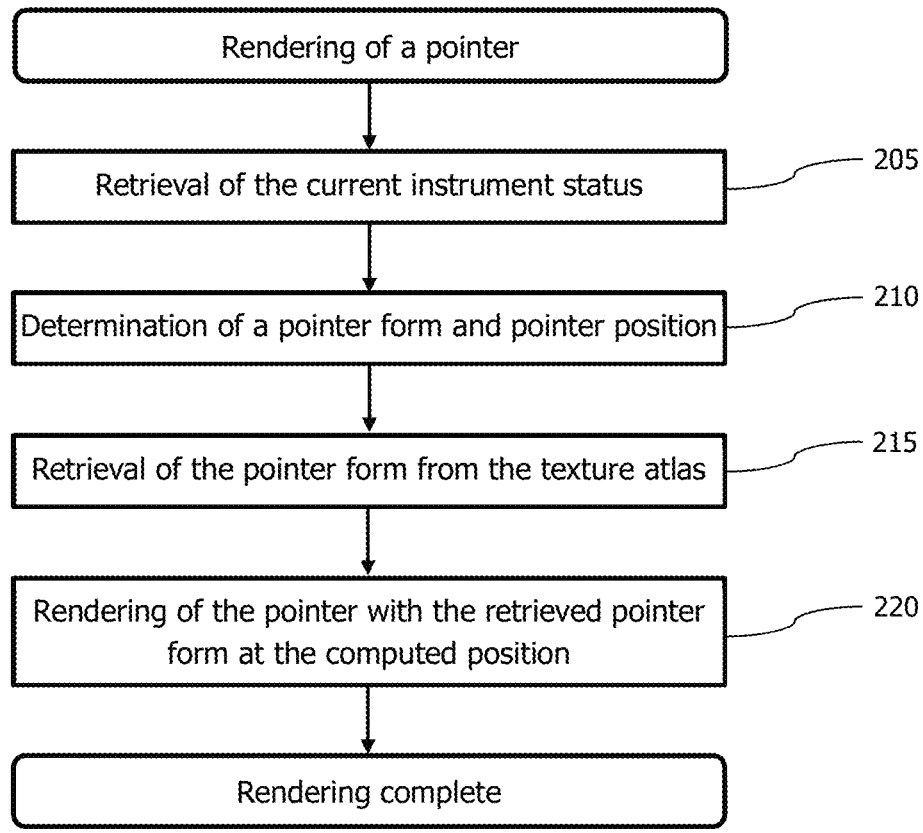
FIG. 6 shows an example of a flow chart of a method for displaying a pointer in an instrument panel.
Figure 7:
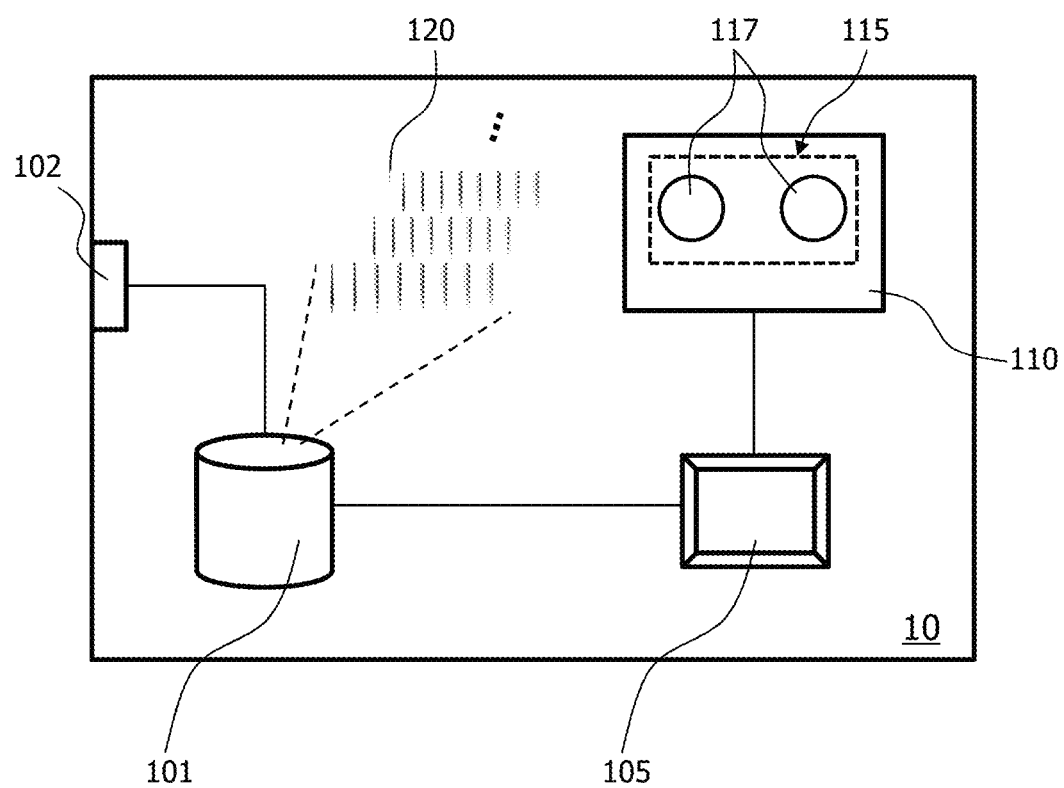
FIG. 7 shows, schematically, a device for displaying an instrument panel.

FIG. 6 shows an example of a flow chart of a method for displaying a pointer in an instrument panel 115 (FIG. 7). This method serves for the actual rendering of a pointer on a display module 110. For this purpose, the current instrument status is first retrieved in step 205. One or more specific parameters of the instrument 117 is/are thereby retrieved and/or computed, such as, for example, a value that is to be displayed in the instrument 117. Then, on the basis of the parameter, a pointer form 121-128 and optionally also a pointer position is determined in step 210. In a simple form, a comparison of the parameter with at least one threshold value is carried out in order to ascertain the predetermined possible region of all the parameter values in which the retrieved parameter (instrument status) is situated.

When determining the pointer form 121-128 and optionally the pointer position, a speed of the pointer can be determined on the basis of one or more earlier parameter values (instrument statuses) and/or a future point in time at which the pointer will be displayed in the instrument panel 115 can be used. The pointer form 121-128 is determined, for example, on the basis of the determined speed and/or acceleration of the pointer and/or position of the pointer within the instrument 117. Thus, different speed/acceleration ranges can identify a pointer form 121-128, whereby a possible speed/acceleration range for the pointer is divided into different speed/acceleration ranges, to each of which a pointer form 121-128 is allocated.

Then, in step 215, the determined pointer form 121-128 is retrieved from the texture atlas 120. A specific pointer form 121-128 of a specific pointer type can thereby be retrieved from the texture atlas via an identifier and/or coordinates. A coordinate origin U for the first pointer form 121 is shown by way of example in FIG. 3. If all the pointer forms 121-128 in the texture atlas 120 are of the same size, the respective pointer form 121-128 can be retrieved quickly and simply via the respective coordinate origin and the fixed size. The retrieval can here comprise the reading of a graphic, texture, image, etc. or simply the reading of pixel values from the texture atlas. In step 215, raw data for the display on a display module 110 are read from the texture atlas or optionally generated, for example.

Finally, in step 220, rendering of the pointer with the retrieved pointer form takes place. On the basis of the determined pointer position, the graphic, texture, image, etc. extracted from the texture atlas 120 can be placed at the corresponding pixel position within the graphics memory. Optionally, a rotation, flipping, a zoom function of the graphic, texture, image, etc. extracted from the texture atlas 120 (extracted pixel values) also takes place, in order to position the retrieved pointer form 121-128 correctly corresponding to the instrument 117 and bring it to the correct size. Pixel values can thereby be transferred from the texture atlas 120 (with or without further processing of the pixel values) to a graphics memory. Pixel data which can be represented (made visible) on a display module 110 are thus from the raw data of the selected pointer form 121-128.

The determination of the pointer form 121-128 can further comprise a determination of a pointer type. The pointer type can be chosen in dependence on the instrument 117 and/or in dependence on a user preference. For each pointer type, the texture atlas 120 can contain a corresponding group of pointer forms 121-128. Alternatively, each texture atlas 120 contains a specific pointer type and the different pointer forms 121-128 thereof.

FIG. 7 shows, schematically, a device 10 for displaying an instrument panel 115. The device 10 can be a general control device in a vehicle (not shown). Alternatively, the device 10 can be a special graphics module for displaying instruments 117.

The device 10 comprises for that purpose a memory 101, which is adapted to store at least one texture atlas 120, and also a controller 105 and a display module 110. The controller 105 is adapted to display or represent a method for displaying a pointer in an instrument panel 115 on the display module 110. The display module 110 is correspondingly adapted to display at least one instrument panel 115 having at least one pointer instrument 117. One or more pointer instruments 117 can thereby be unchangeably displayed in the display module 110, while the controller 105 controls only the display of a pointer. The controller 105 can of course also control the display of all the objects (such as, for example, the scale or the scale section of the instrument 117 from FIG. 4) that are displayed in the display module 110, including all pointer instruments 117.

In an optional form, the device 10, in particular the controller 105, can edit and/or supplement the texture atlas 120. Thus, one or more pointer forms 121-128 can be computed, wherein the display data (pixel values) for the specific pointer form 121-128 are so computed that, in the simplest case, they can be transferred to a graphics memory for direct display on the display module 110. In the memory 101, the pointer forms 121-128 are stored in at least one texture atlas 120. FIG. 7 shows, by way of example and schematically, a texture atlas 120 for each of three pointer forms 121-128.

Alternatively or in addition, the device 10 can comprise an interface 102 via which data representing a texture atlas 120 can be received. The interface 102 can further be adapted to provide the data for storage of a texture atlas 120 to the controller 105 and/or the memory 101.

The pixel data obtained from the texture atlas 120 can be transferred, with or without further processing, to a graphics memory, wherein the graphics memory can be integrated in the controller 105 or can be in the form of a dedicated memory (not shown). The transfer of the pixel data from the graphics memory, which can be implemented, for example, in the form of a video-RAM, to the display module 110 then takes place with the frame rate of the display module 110.

For updating the graphic displayed in the display module 110, the pixel data in the graphics memory can be updated at specific predetermined time intervals. Preferably, the updating of the graphics memory takes place with the same frequency/timing as the frame rate of the display module (for example 60 Hz). Alternatively, the graphics memory can also be updated with a greater or lesser frequency/timing. When retrieving the current instrument status and determining the pointer form (steps 205 and 210 in FIG. 6), the controller 105 can first also determine whether a representation of the pointer is necessary after an updating interval (1/60 s) of the display module 110. In particular in the case of small changes (low speeds) of the pointer, the movement of the pointer may not be visible due to the pixel resolution of the display module 110, so that a "new" pointer form 121-128 and pointer position 135 does not have to be determined/computed and thus the pointer form 121-128 does not have to be retrieved either. The graphics memory would not be updated in this case.

The form of rendering of a pointer disclosed herein makes possible a continuous computing power for representing different pointer forms 121-128 and also different pointer types with correspondingly different pointer forms 121-128, since the computation for representing the particular pointer form 121-128 or pointer type already took place beforehand, and the corresponding result is stored in the texture atlas 120 in the memory 101. Access to the memory 101 and the corresponding conversion of the pixel data to the display module 110 are the same for every pointer form 121-128. The pointer forms 121-128 stored in the texture atlas 120 can also be used for more than one instrument 117, so that the computing power for displaying the instrument panel 115 can be significantly reduced overall.

Furthermore, the use of at least one texture atlas 120 allows the different pointer forms 121-128 and pointer types to be changed easily, so that the instrument panel 115 is simple to adjust.

The invention claimed is:

1. A method for displaying a pointer in a digital instrument panel, the method comprising:
   retrieving status data representing a status to be displayed by the pointer at a future point in time;
   determining a pointer form on the basis of the status data and a unique identifier of the determined pointer form, the determined pointer form reflecting the status;
   retrieving the determined pointer form from a texture atlas via the unique identifier, wherein the texture atlas comprises a plurality of pre-computed graphics of four or more and a respective unique identifier for each graphic of the plurality of pre-computed graphics,
      one graphic of the plurality of pre-computed graphics being a graphic of a pointer having sharp contour lines, and within any two pointers among the plurality of pointers, one of the pointers will have an increased motion blur over the other one, wherein an increased motion blur comprises an increased range spread and a decreased display density, and
      each of at least two of the others of the plurality of pre-computed graphics being a graphic of a pointer having motion blur that is different relative to motion blur of a graphic of a pointer of another of the plurality of pre-computed graphics; and
   rendering the pointer in the instrument panel with the retrieved pointer form.

2. The method of claim 1, wherein the determining the pointer form comprises calculating a pointer position, and wherein the rendering the pointer comprises rendering the pointer with the retrieved pointer form at the calculated pointer position.

3. The method of claim 2, wherein the calculating the pointer position comprises calculating a pointer position for the future point in time including a delay between the retrieving the status data and the rendering of the pointer in the digital instrument panel.

4. The method of claim 1, wherein the determining the pointer form further comprises:
   determining a speed of the pointer with which the pointer is to be displayed as moving in an instrument of the instrument panel; and
   determining a motion blur type on the basis of the determined speed of the pointer.

5. The method of claim 4, wherein the determining the motion blur type comprises comparing the speed of the pointer with at least one threshold value, wherein the motion blur type is chosen based on whether the speed of the pointer exceeds the at least one threshold value.

6. A device for displaying an instrument panel, the device comprising:
   a display module configured to display at least one instrument panel having at least one pointer instrument;
   a controller configured to carry out the method of claim 1 using the display module.

7. The device of claim 6, further comprising:
a memory configured to store the texture atlas and to provide it to the controller.

8. The device of claim 7, wherein the controller is further configured to:
compute one or more pointer forms; and
store the computed one or more pointer forms in the memory.

9. The device of claim 8, wherein the computation of the one or more pointer forms is carried out on the basis of a user preference.

10. The device of claim 7, further comprising:
an interface adapted at least to receive data representing the texture atlas and to provide the data to the controller and/or to the memory for storage of the texture atlas.

11. A vehicle having the device of claim 6.

12. The method of claim 1, wherein the respective motion blurs of the at least two of the others of the plurality of pre-computed graphics differ from one another by at least one of a blurring side, a blurring edge, an after-glow, a fore-glow, or at least one blurring contour line of the pointer.

13. The method of claim 1, wherein the respective motion blurs of the at least two of the others of the plurality of pre-computed graphics differ from one another by at least one of a different degree of transparency, a different degree of color blend of a color of the pointer with a color of a background of the instrument, or a different degree of brightness.

* * * * *